(12) United States Patent
Halbani et al.

(10) Patent No.: US 10,657,124 B2
(45) Date of Patent: May 19, 2020

(54) AUTOMATIC GENERATION OF STRUCTURED QUERIES FROM NATURAL LANGUAGE INPUT

(71) Applicant: SAP SE, Walldorf (DE)

(72) Inventors: Ronen Halbani, Natania (IL); Shahar Tarshish, Herzelia (IL)

(73) Assignee: SAP SE, Walldorf (DE)

( * ) Notice: Subject to any disclaimer, the term of this patent is extended or adjusted under 35 U.S.C. 154(b) by 359 days.

(21) Appl. No.: 15/373,285

(22) Filed: Dec. 8, 2016

(65) Prior Publication Data

US 2018/0165330 A1 Jun. 14, 2018

(51) Int. Cl.
*G06F 16/2452* (2019.01)

(52) U.S. Cl.
CPC .............. *G06F 16/24522* (2019.01)

(58) Field of Classification Search
CPC .............. G06F 16/3329; G06F 16/243; G06F 16/3344; G06F 16/80; G06F 16/9032; G06F 16/24522
See application file for complete search history.

(56) References Cited

U.S. PATENT DOCUMENTS

| | | | | |
|---|---|---|---|---|
| 5,924,089 | A * | 7/1999 | Mocek | G06F 16/24522 |
| 6,023,697 | A * | 2/2000 | Bates | G10L 15/22 |
| 9,858,925 | B2 * | 1/2018 | Gruber | G10L 15/18 |
| 10,191,734 | B1 * | 1/2019 | Totale | G06F 8/36 |
| 10,297,253 | B2 * | 5/2019 | Walker, II | G10L 15/22 |
| 2004/0163043 | A1 * | 8/2004 | Baudin | G06F 16/313 715/234 |
| 2005/0289124 | A1 * | 12/2005 | Kaiser | G06F 16/24522 |
| 2008/0104071 | A1 * | 5/2008 | Pragada | G06F 16/24522 |
| 2008/0235199 | A1 * | 9/2008 | Li | G06F 16/243 |
| 2010/0024031 | A1 | 1/2010 | Shribman et al. | |
| 2010/0037161 | A1 * | 2/2010 | Stading | G06F 16/283 715/764 |
| 2014/0236579 | A1 * | 8/2014 | Kurz | G06F 17/28 704/9 |

(Continued)

OTHER PUBLICATIONS

U.S. Appl. No. 15/091,191, filed Apr. 5, 2016, Halbani et al.

*Primary Examiner* — Dennis Truong
(74) *Attorney, Agent, or Firm* — Fish & Richardson P.C.

(57) ABSTRACT

The present disclosure relates to computer systems and computer-implemented methods for automatically enabling natural language rules in a structured rule engine. In one example, the method includes receiving an input identifying an unstructured query corresponding to a particular application associated with a rules framework associated with a pre-defined query structure format, analyzing the received input based on a first set of design time artifacts associated with the particular application and a second set of design time artifacts associated with the rules framework, the first set of artifacts uniquely associated with the particular application and the second set of artifacts generically associated with the rules framework, wherein the second set of design time artifacts are applied commonly to a plurality of different applications. A structured query for the particular application is generated in the pre-defined query structure format of the rules framework based on the first and second set of artifacts.

20 Claims, 10 Drawing Sheets

(56) References Cited

U.S. PATENT DOCUMENTS

| | | | | |
|---|---|---|---|---|
| 2014/0236986 | A1* | 8/2014 | Guzman | G06Q 10/107 |
| | | | | 707/769 |
| 2015/0227619 | A1* | 8/2015 | Xie | G06F 16/951 |
| | | | | 707/706 |
| 2015/0269175 | A1* | 9/2015 | Espenshade | G06F 16/90324 |
| | | | | 706/47 |
| 2015/0324422 | A1* | 11/2015 | Elder | G06F 17/279 |
| | | | | 707/722 |
| 2016/0103822 | A1* | 4/2016 | George | G06F 16/24522 |
| | | | | 704/9 |
| 2016/0350406 | A1* | 12/2016 | Byron | G06F 16/3344 |
| 2017/0075953 | A1* | 3/2017 | Bozkaya | G06F 17/2775 |
| 2017/0161262 | A1* | 6/2017 | Bhatt | G06F 16/24522 |
| 2017/0235735 | A1* | 8/2017 | Ignatyev | G06F 16/24578 |
| | | | | 706/12 |
| 2018/0095962 | A1* | 4/2018 | Anderson | G06F 16/243 |
| 2018/0349377 | A1* | 12/2018 | Verma | G06F 17/278 |

\* cited by examiner

| Entity types | |
|---|---|
| Attribute | |
| Data_object | |
| Relation | |
| comparison | |
| aggregate | |
| term | |
| Simple_compari son_expression | |

Entity Types
*615*

| Patterns | Type | Key entities |
|---|---|---|
| \<Attribute\> of the \<Data_object\> | Term | Attribute, data object |
| \<Aggregate\> of \<term\> | aggregate_expression | Aggregate, term |
| \<term\> \<comparison\> \<value\> | Simple_comparison_ expression | term, comparison, value |
| \<aggregate_exp\> \<term\> \<comparison\> \<value\> | Aggregate_comparison _expression | Aggregate, term, comparison, value |

Patterns Container
*610*

| Token | Entity type |
|---|---|
| Sum | Aggregate |
| Average | Aggregate |
| Equal | Comparison |
| Greater than | Comparison |

Tokens Container
*605*

FIG. 6 – Generic Dictionaries

| Greater than | |
|---|
| Bigger |
| Larger |
| Way bigger |
| above |
| Much bigger than |
| > |
| ... |

| Less | |
|---|
| smaller |
| lesser |
| Way smaller |
| Way less than |
| < |
| ... |

| sum | |
|---|
| total |
| Sum of |
| count |
| Tally |
| The sum of |
| ... |

Generic Dictionaries *705*

FIG. 7

FIG. 8 – Application-Specific Artifacts

| Counter | Token | Type | Patent |
|---|---|---|---|
| 1 | Customer | Data_object | 1 |
| 2 | age | attribute | |
| 3 | Customer's age | semantic | |
| 4 | Greater than | Comparison | 5 |
| 5 | Greater than 30 | semantic | 2 |
| 6 | 30 | Number | 4 |

Entity Map
905

FIG. 9

| Expression Stack | |
|---|---|
| Age of the customer | Term |
| Greater Than | Comparison |
| 30 | Number |

Expression Stack *1005*

FIG. 10

AUTOMATIC GENERATION OF STRUCTURED QUERIES FROM NATURAL LANGUAGE INPUT

TECHNICAL FIELD

The present disclosure relates to computer systems and computer-implemented methods for automatically enabling natural language rules in a structured rule engine.

Software systems can include a rules engine providing business users with the ability to write simple and intuitive natural language business rules based on a predefined thesaurus and language tokens. However, to provide such systems to end users, an understanding of the particular language and syntax of the rules engine must be known, as a single format for requesting information and data is requested to express relationships between entities and their attributes. In some instances, even slight deviations from the defined syntax may result in validation errors.

SUMMARY

The present disclosure involves systems, software, and computer implemented methods for providing quality-driven processing of out-of-order data streams based on a configurable quality metric. In one example, the method includes receiving an input identifying an unstructured query corresponding to a particular application associated with a rules framework associated with a pre-defined query structure format, analyzing the received input based on a first set of design time artifacts associated with the particular application and a second set of design time artifacts associated with the rules framework, the first set of design time artifacts uniquely associated with the particular application and the second set of design time artifacts generically associated with the rules framework, wherein the second set of design time artifacts are applied commonly to a plurality of different applications, and generating a structured query for the particular application in the pre-defined query structure format of the rules framework based on the first and second set of design time artifacts.

While generally described as computer implemented methods and software embodied on non-transitory, tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 6 illustrates an example tokens container, patterns container, and entity types as derived from the defined rules and syntax of the rules engine.

FIG. 7 illustrates an example set of generic dictionaries used by the rules engine to define synonyms for various terms with a particular token meaning the same thing as the original token.

FIG. 9 illustrates an example entity map for an example unstructured input.

FIG. 10 illustrates an example expression stack generated for an example unstructured input.

DETAILED DESCRIPTION

Figure 1:
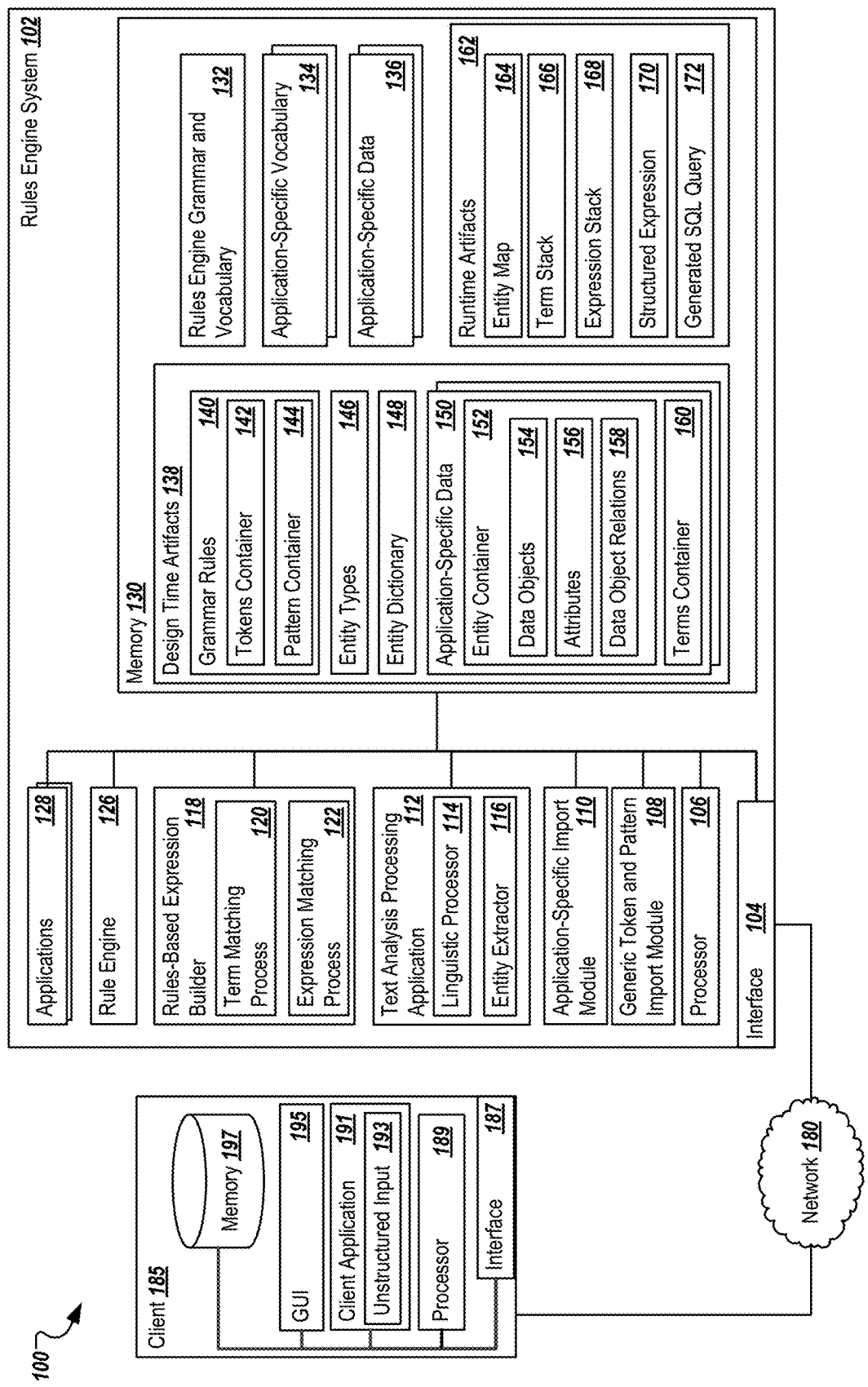
FIG. 1 is a block diagram illustrating an example system for automatically enabling natural language rules in a structured rule engine.

The present disclosure describes computer-implemented methods and systems for automatically enabling natural language queries and interactions in applications based on or associated with a structured rule engine. In particular, the present disclosure provides an enhanced rules engine that can allow users the ability to provide simple and intuitive inputs based on a predefined thesaurus, or vocabulary, and language tokens associated with a particular application, as well as a common vocabulary and syntax corresponding to the rules engine functionality potentially shared by a plurality of different applications. In general, a vocabulary can be a representation model of all entities, their attributes, and various associations between those entities and attributes for a particular application, where the vocabulary for each application may differ based on the operations of the application and the context of the data associated therewith. In combination with the application-specific vocabulary, underlying rules engine systems and platforms may share syntaxes, comparative language, and other aspects that are used among a plurality of applications.

In one example, a user may request or submit a natural language or unstructured query regarding a set of associated entities and their attributes within or associated with a particular application and for a particular data set. The present solution allows that user an intuitive way to ask or submit the query without requiring that user to have a detailed and well-defined knowledge of the application and its data. Specifically, users are able to provide such queries in a natural language and/or unstructured format, using the predetermined knowledge about the rules engine generically and the particular application specifically to interpret the natural language input and identify the set of terms and expressions used therein. For example, a set of design time artifacts associated with both the rules engine platform (specifically, for example, its required syntax, and grammar) and the particular application (e.g., the application's internal vocabulary and context information) can be generated and used during the interpretation process, allowing for structured queries satisfying both the grammar and syntax of the rules engine and the specific language and context of the particular application to be generated.

In one example, one specific rule in a rule engine associated with a particular application may accept an input such as "age of the player is greater than 30". In some instances, the rules engine platform may provide automatic suggestions to users as the input is being received, such as by analyzing potential comparators, aggregators, and other evaluation-based terms acceptable to the rules engine. Once the structured input is provided, the rules engine can then compile and parse the input into a corresponding database structure query language (SQL) input, such as:

```
(select * from (select T34."age" A56 from
"_SYS_BIC"."demo.gaming.model/PLAYER" T34 where
(A56 > 30)));
```

To generate such a SQL query, intimate knowledge of the database and table structure of the data source associated with the particular application would need to be known and appreciated, along with the specific table and column names and data fields. The rules engine automates such calculations. However, to perform those calculations, the input to the rules engine must correspond to the known and expected syntax such that the input, or expression, of "age of the player is greater than 30" can be provided to the rules engine, thereby allowing the detailed SQL output to be created. In other words, to generate the SQL query above, the rules engine requires a structured input in a single acceptable format that expresses the relation of entities and attributes, thereby limiting the input acceptable to the rules engine. This specific requirement can make submitting such queries and inputs difficult or impossible for non-technical business users or other users not intimately familiar with the underlying rules engine. Should the user include any mistakes in the submission, validation will fail and no corresponding SQL query may be generated.

To solve these issues for first-time and novice users, the present solution integrates a rules engine along with a natural language processing or text analysis engine to provide those users with a natural text writing experience. The present system can generate design time artifacts describing the context of the particular application and the rules engine to allow for successful later interpretation of unstructured input. Because the rule to be translated into the SQL query must be 100% accurate, the translation of unstructured natural language input into the structured format of the rules engine is required. Using this process, any of the following inputs can be accurately translated into the correct rules engine format of "Age of the customer is greater than 30": "Age of the customer is bigger than 30", "Customer's age is greater than 30", "the customer's age must be at least 30 years old", "customer's age is definitely more than 30 years old." As such, significant flexibility can be provided to the previously rigorous input requirements, transforming the questions or queries into the suitable format before being submitted to the strict rules engine requirements.

Importantly, at design time, a first set of artifacts describing the specific application's syntax and context are generated, while a second set of artifacts describing the rules engine's syntax and pattern requirements are identified. In some instances, the second set of artifacts associated with the rules engine are used across a plurality of applications, each application associated with, integrating, or part of the underlying rules engine, but with each application having its own unique data sets and sources. Using the combined sets of design time artifacts, the present solution can identify the data being requested (e.g., based on the application's vocabulary and the rules engine's comparators/aggregators) and map that result into the syntax of the rules engine. Once done, the mapped input can be provided to the rules engine for its standard processing.

The present solution provides significant advantages over other available rules engines. For example, other engines offer at most a structured "close to" language, where some similarities may be identified in inputs. The present solution leverages the application-specific vocabulary along with a text analysis engine to provide natural language expressions which are then transformed into the structured syntax of the rules engine, whereas other solutions have a structured manner for receiving queries prior of transforming those queries into SQL or an equivalent output. Those solutions also require a number of predefined and specifically structured paths of expressing relations, thereby falling significantly short of the natural unstructured text expressions that can be handled by the present solution.

Turning to the illustrated embodiment, FIG. 1 is a block diagram illustrating an example system 100 for automatically enabling natural language rules in a structured rule engine. As illustrated in FIG. 1, system 100 is a client-server system capable of extracting design time artifacts associated with the rules engine and design time artifacts specific to one or more applications 128 associated with rules engine system 102. Once those design time artifacts are generated/stored, unstructured input received from one or more users (e.g., client 185) can be received, interpreted, and mapped into a structured expression 170 suitable as input for the particular syntax of the rules engine 126, allowing a corresponding SQL (or other type of) query 172 to be created.

As illustrated, system 100 includes or is communicably coupled with the client 185 and a rules engine system 102, where these systems are connected, at least in part, by network 180. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, client 185 and the rules engine system 102, among other illustrated components, may be any computer or processing device such as, for example, a blade server, general-purpose personal computer (PC), Mac®, workstation, UNIX-based workstation, smartphone, tablet, or any other suitable device. Moreover, although FIG. 1 illustrates a single rules engine system 102, rules engine system 102 can be implemented using two or more systems, as well as computers other than servers, including a server pool. Alternatively, the functionality of the rules engine system 102 may be available locally at client 185, at network 180 as a cloud-based solution, or in any other suitable location. The present disclosure contemplates computers other than general purpose computers, as well as computers without conventional operating systems. In one example, for instance, one or more of the applications 128 may execute remotely from at least a part of the rules engine system 102.

In general, the rules engine system 102 is a system used to manage a rules engine 126 and one or more associated applications 128 to enable the use of natural language and other unstructured inputs as inputs into an otherwise rigidly or specifically structured expressions to those applications 128, where the applications 128 are associated with a particular rules engine 126. Traditionally, input to the rules engine 126 must be provided into a specific grammar and syntax specific to the rules engine 126, with the output of the rules engine 126 representing a well-defined query that can be executed against data associated with a particular application 128. The rules engine system 102 represents an intelligent system capable of translating the unstructured input from users into the structured input required by the rules engine 126 using known information and artifacts associated with both the vocabulary and context of the applications 128 and the specific syntax and grammar used by the rules engine 126.

As illustrated, the rules engine system 102 includes an interface 104, a processor 106, a generic token and pattern import module 108, an application-specific import module 110, a text analysis processing application 112, a rules-based expression builder 118, a rules engine 126, one or more applications 128, and memory 130. The interface 104 is used by the rules engine system 102 for communicating with other systems in a distributed environment—including within the environment 100—connected to the network 180, e.g., client 185, external applications 128, other portions or components external to the system 102, as well as other systems communicably coupled to the network 180. Generally, the interface 104 comprises logic encoded in software and/or hardware in a suitable combination and operable to communicate with the network 180. More specifically, the interface 104 may comprise software supporting one or more communication protocols associated with communications such that the network 180 or interface's hardware is operable to communicate physical signals within and outside of the illustrated environment 100.

Network 180 facilitates wireless or wireline communications between the components of the environment 100 (e.g., between the client 185 and the rules engine system 102, as well as with any other local or remote computer, such as additional clients, servers, or other devices communicably coupled to network 180, including those not illustrated in FIG. 1). In the illustrated environment, the network 180 is depicted as a single network, but may be comprised of more than one network without departing from the scope of this disclosure, so long as at least a portion of the network 180 may facilitate communications between senders and recipients. In some instances, one or more of the illustrated components (e.g., the rules engine system 102 or portions thereof) may be included within network 180 as one or more cloud-based services or operations. The network 180 may be all or a portion of an enterprise or secured network, while in another instance, at least a portion of the network 180 may represent a connection to the Internet. In some instances, a portion of the network 180 may be a virtual private network (VPN). Further, all or a portion of the network 180 can comprise either a wireline or wireless link. Example wireless links may include 802.11a/b/g/n/ac, 802.20, LTE, 3G and/or any other appropriate wireless link. In other words, the network 180 encompasses any internal or external network, networks, sub-network, or combination thereof operable to facilitate communications between various computing components inside and outside the illustrated environment 100. The network 180 may communicate, for example, Internet Protocol (IP) packets, Frame Relay frames, Asynchronous Transfer Mode (ATM) cells, voice, video, data, and other suitable information between network addresses. The network 180 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the rules engine system 102 includes processor 106. Although illustrated as a single processor 106 in FIG. 1, two or more processors 106 may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the rules engine system 102 and its components. Specifically, the processor 106 executes the algorithms and operations described in the illustrated figures, including the operations performing the functionality associated with the rules engine system 102 generally, as well as the various software modules therein, including the functionality for sending communications to and receiving transmissions from the various systems involved in the receiving of particular unstructured inputs and translation into structured inputs to the rules engine 126.

As illustrated, the rules engine system 102 includes a generic token and pattern import module 108 for obtaining and generating design-time artifacts associated with the rules engine 126 and its required inputs itself, as well as an application-specific import module 110 for obtaining and generating design-time artifacts associated with each of the one or more applications 128 associated with the rules engine system 102. The design time artifacts associated with the rules engine 126 may be associated with or based on an analysis of a defined rules engine grammar and vocabulary store 132. This store 132 can define the particular syntax required for input to the rules engine 126, particular patterns of entities and/or entity types recognized by the rules engine 126, as well as particular aggregators, comparators, and other analytical evaluations acceptable or understood by the rules engine 126. In some instances, the vocabulary of the rules engine 126 may be such that similar or related terms are known to correspond to one or more acceptable terms. For example, the phrases "bigger," "larger," "way bigger," "above," and "much bigger than" may all be defined to correspond to "greater than" in the vocabulary. Similarly, the phrases "total," "sum of," "count," "tally," and others may equate to "sum" within the vocabulary. This information can be used to modify the rules engine input prior to submission by the present solution. In the illustrated example, the generic token and pattern import module 108 can access the rules engine grammar and vocabulary 132 to generate a set of design-time artifacts for use with all applications 128 associated with the underlying rule engine 126, such that these design-time artifacts can be considered generic artifacts not specific to a particular application 128. The artifacts may include a set of grammar rule artifacts 140, including a tokens container 142 (e.g., identifying particular terms or phrases understood by the rules engine 126 along with their entity type) and a patterns container 144 (identifying patterns of entities included in particular acceptable rules, the patterns based on the entity types included in the analyzed unstructured input). The design-time artifacts 138 associated with the rules engine grammar and vocabulary 132 may also be used to identify a set of entity types 146 and an entity dictionary 148, the entity dictionary 148 identifying a set of various terms/phrases used in rules engine 126 and a single way to express those terms for input purposes (e.g., "sum of," "bigger," etc.) being similar or equivalent to the rules engine-approved "sum" aggregator. The generic token and pattern import module 108 may, in some instances, be used a single time at the creation of the rules engine system 102, where the artifacts are then used in the system until and unless changes to the underlying rules engine 102 and/or rules engine grammar and vocabulary 132 are identified or detected, or as a request for re-calculation of the design-time artifacts are received.

The application-specific import module 110 is used, as noted, to analyze the application-specific sets of data and contexts. In some instances, the application-specific information can be imported prior to the first use of the rules engine 126 in association with a particular application 128, while in others the application-specific information can be imported in response to a particular application 128 being associated with the rule engine 126. In any event, the application-specific import module 110 can access sets of application-specific vocabulary 134 and application-specific data 136 to determine the particular objects, metadata, and information associated with the particular application 128. The application-specific vocabulary 134 and the application-specific data 136 may be provided in a single location or based on a particular data source, table, spreadsheet, database or other document, and may be based on the data included therein and/or metadata describing the documents/files. Information about the particular applications can be imported into the set of design-time artifacts 138 as the application-specific data sets 150, where each application 128 has a corresponding data set 150. The imported data sets 150 can include an entity container 152 and a terms container 160 for each application 128 in the present example. The entity containers 152 can include a data object container 154 (e.g., identifying particular data objects relevant to the application 128), an attributes container 156 (e.g., identifying attributes associated with the underlying application-specific data, including corresponding parent data objects), and a data object relations/association container 158 (e.g., identifying relationships between different data objects to be used in the text and expression analysis). The different components of the entity container 152 can be used during the expression building process to find entities included in the unstructured input, their types, and relationships between other entities and attributes. The terms container 160 can be generated based on application-specific content (e.g., the application's vocabulary) and can be used to validate particular terms created during the term and expression building operations of the solution. Terms, in one example, can include particular phrases relevant to the application, the type of the term, and key entities included within the term, allowing the terms to be identified by the particular entities included in the unstructured input.

The rules engine system 102 includes the text analysis processing application 112 (or corresponding functionality), where the text analysis processing application 112 receives the initial unstructured input from the user (e.g., of client 185) and performs an initial textual analysis to identify entities within input. Initially, the text analysis processing application 112 can perform a tokenization of the particular input. That is, the different portions of the input can be normalized into a linguistic base form. In one example, the unstructured input may be "Customer's age is way greater than 30." The tokenization process can change "customer's" to "customer", "way greater" to "greater," and other similar tokenization operations. Second, the text analysis processing application 112 can stem the phrases as appropriate by separating the word sequences into a decomposed format. A phrase "customer is named John" can be stemmed to the values of "customer" "is" "named" "John", with those values identified as individual tokens or artifacts. Other suitable linguistic processing can be performed on the input, and can include other types of text analysis used to prepare received input for further entity- and fact-based extraction. The text analysis processing application 112 can then use an entity extractor process 116 to identify application- and rules engine-related tokens and information from the processed input. The entity extractor process 116 can use information from the entity container 152 corresponding to the appropriate application 128 and information specific to the rules engine (e.g., the entity types 146 and entity dictionary 148) to generate runtime artifacts 162 associated with the current input. In particular, the extractor process 116 can generate an entity map 164 from the initial analysis, where the entity map 164 identifies the identified tokens from the unstructured input, the token type (e.g., data object, attribute, semantic, comparison, aggregator, number, etc.), and any identified relationship to another identified entity.

Once the entity map 164 is generated, the operations of the rules engine system 102 may shift to the illustrated rules-based expression builder 118. The rules-based expression builder 118 includes a term matching process 120 and an expression matching process 122. The term matching process 120 is used to identify the context of the question or query being submitted. Using the entity map 164, the term matching process 120 identifies an attribute and identified a parent token (based on the determined relationships in the entity map). The process 120 continues until a root parent is identified, with each term identified being added to a term stack 166. As each of the items in the entity map 164 are analyzed, the term stack 166 can be increased until all tokens within the entity map 164 are considered. As the set of related terms are identified, vocabulary containers (i.e., the entity container 152 and its sub-portions) are searched to validate the term as valid. If the entries are valid—that is, they exist within the application's vocabulary found in the application-specific design-time artifacts, then terms corresponding to one or more terms included in the terms container 160 can be identified based on the matching entities keys found in the entity map 164. Once a matching term is identified, that term can be added to an expression stack 168 along with its particular entity type, where the set of expressions identified from a particular input are stored. In some instances, multiple terms may be included in a received query. One example may be, for instance, an input of "age of the customer is greater than 50 and name of the customer is John." In those instances, the process may be performed twice to obtain both terms.

Once all entities have been evaluated and identified for a particular expression added to the expression stack 168, the expression matching process 122 can be performed. The expression matching process 122 allows the semantics of the rule engine 126 to be considered as to how the expressions identified in the expression stack 168 can be combined. For example, each expression may be a term, a value, a comparison, or others. The types of the various expressions are compared to the patterns accepted by the rules engine 126 to identify a potential match. If a match is found, the expression may correspond to the intended search. In some instances, users may be presented with the matched expression and asked to confirm the validity of the adapted input, which is then represented as the resulting structured expression 170. Not only will this allow an assurance of correctness before submitting the expression to the rules engine 126, but it can also provide users with a better understanding of how to form queries in the future. Once confirmed (or after the initial identification), the structured expression 170 that matches the accepted syntax and format of the rules engine 126 can be submitted to the rules engine 126 to create the generated SQL query 172, which can then be used against the application-specific data 136 of the corresponding application 128 to provide a result set.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

Memory 130 of the rules engine system 102 may be a single memory or multiple memories 130. The memory 130 may include any memory or database module(s) and may take the form of volatile or non-volatile memory including, without limitation, magnetic media, optical media, random access memory (RAM), read-only memory (ROM), removable media, or any other suitable local or remote memory component. In some instances, at least a portion of the memory 130 may include an in-memory database. The memory 130 may store various objects or data, including the design-time artifacts 138, the runtime artifacts 162, application-specific data and vocabularies, rule engine-specific grammar and vocabulary 132, financial data, user information, administrative settings, password information, caches, applications, backup data, repositories storing business and/or dynamic information, and any other appropriate information including any parameters, variables, algorithms, instructions, rules, constraints, or references thereto associated with the purposes of the rules engine system 102. Additionally, the memory 130 may store any other appropriate data, such as VPN applications, firmware logs and policies, firewall policies, a security or access log, print or other reporting files, as well as others. While the application-specific information is illustrated within memory 130 of the rules engine system 102, such information can be stored remotely from the memory 130 in other implementations and instances.

Illustrated environment 100 includes one or more clients 185. Particular clients 185 may connect to the rules engine system 102 to submit or enter particular unstructured inputs for conversion and submission to the rules engine 126. Each client 185 may be specifically associated with a particular user or multiple users. In other instances, clients 185 may be generally available computing systems accessible by a plurality of users. As illustrated, users may submit unstructured inputs 193 via client application 191, which may include or be associated with a web browser, a remotely executed application associated with the rules engine 126, a particular application 128, or any other suitable application or component. The client application 191 may be associated with an application window or presentation used to present information associated with that application to the user regarding the client application 191, such as in the GUI 195. In some instances, the client application 191 may be used to interact with the expression building operations, as well as in generating the design-time artifacts associated with either the rules engine 126 or one or more of the particular applications 128.

The illustrated client 185 is intended to encompass any computing device such as a desktop computer, laptop/notebook computer, mobile device, smartphone, personal data assistant (PDA), tablet computing device, one or more processors within these devices, or any other suitable processing device. In general, the client 185 and its components may be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer. In some instances, the client 185 may comprise a computer that includes an input device, such as a keypad, touch screen, or other device(s) that can interact with the client application 191, and an output device that conveys information associated with the operation of the applications and their application windows to the user of the client 185. Such information may include digital data, visual information, or a GUI 195, as shown with respect to the client 185. Specifically, the client 185 may be any computing device operable to connect to or communicate with the rules engine system 102, other clients 185, and/or other components via network 180, as well as with the network 180 itself, using a wireline or wireless connection. In general, client 185 comprises an electronic computer device operable to receive, transmit, process, and store any appropriate data associated with the environment 100 of FIG. 1.

As illustrated, client 185 includes an interface 187, a processor 189, the client application 191, the GUI 195, and memory 197. The interface 187 and processor 189 may be similar to or different than interface 104 and processor 106. In general, processor 189 executes instructions and manipulates data to perform the operations of the client 185. Specifically, the processor 189 executes the algorithms and operations described in the illustrated figures and associated with the client 185, including the operations performing the functionality associated with the client application 191. Further, memory 197 may be similar to or different than memory 130. While illustrated generally, memory 197 may store or maintain information related to the rules engine system 102, one or more of the applications 128, as well as other suitable data.

GUI 195 of the client 185 interfaces with at least a portion of the environment 100 for any suitable purpose, including generating a visual representation of the client application 191. In particular, the GUI 195 may be used to view a presentation associated with the submission or entry of one or more unstructured inputs 193, including the results of a translated or mapped structured expression 170, the generated SQL query 172, or the results of execution of the query 172, as well as to view and interact with various Web pages and applications located local or external to the client 185. Generally, the GUI 195 provides the customer with an efficient and user-friendly presentation of data provided by or communicated within the system. The GUI 195 may comprise a plurality of customizable frames or views having interactive fields, pull-down lists, and buttons operated by the user. For example, the GUI 195 may provide interactive elements that allow a user to view or interact with information related to the operations of the process associated with the expression generation and translation process. In general, the GUI 195 is often configurable, supports a combination of tables and graphs (bar, line, pie, status dials, etc.), and is able to build real-time portals, application windows, and presentations. Therefore, the GUI 195 contemplates any suitable graphical user interface, such as a combination of a generic web browser, a web-enable application, intelligent engine, and command line interface (CLI) that processes information in the platform and efficiently presents the results to the user visually.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate. While applications 128 are illustrated within the rules engine system 102, such applications 128 may be located at any suitable point or location communicably coupled to network 180, including within network 180 itself as a cloud-based application or functionality.

Figure 2:
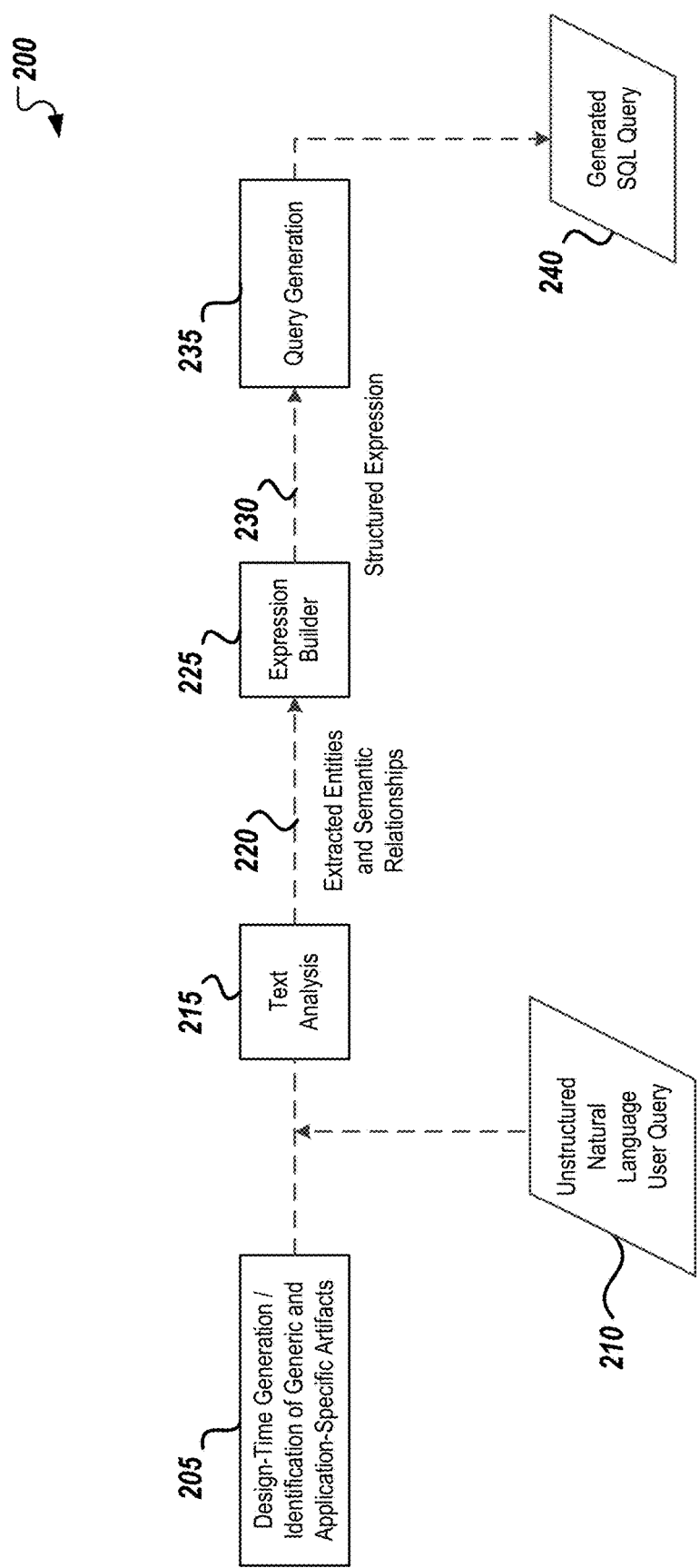
FIG. 2 is an illustration of a simplified process diagram for generation of translated unstructured input into structured expressions.

FIG. 2 is an illustration of a simplified process diagram for generation of translated unstructured input into structured expressions. The illustrated process 200 is intended to demonstrate an example set of operations. Alternative implementations are still contemplated and are not intended to require the particular aspects and components described in FIG. 1.

At 205, a design-time generation process of generic and application-specific artifacts is performed, such as by rules engine system 102 of FIG. 1. The design-time artifacts associated with the rules engine may be used among a plurality of different applications using or associated with the rules engine, while the application-specific artifacts are generated specifically for each different application. In some instances, the rules engine's design-time artifacts may be provided along with an installation of or update to the rules engine, while in other instances the extraction of the design-time artifacts may be generated on-the-fly or in response to user request. The generation of the application-specific artifacts can be generated in response to association of the application with the rules engine, in response to the first request using an unstructured input, or at any other suitable time or in response to any other suitable event.

An unstructured natural language user query 210 can be provided to the rules engine's input. At 215, an initial text analysis process is performed. Linguistic and semantic analysis on the received input can be performed, along with other suitable processes. In response to the operations of the text analysis 215, and based on the input as analyzed using the application-specific and generic artifacts, the text analysis process 215 can identify and extract one or more entities and semantic information and relationships (220) associated therewith. The representation of those extracted entities may be a table, such as entity map 164 of FIG. 1.

At 225, an expression builder operation and process can be performed, similar to those described herein. The expression builder may be a part of and/or an extension of the rules engine or it may be a separate component remote therefrom. In general, the expression builder can perform a term extraction and matching processes to identify one or more terms based on the extracted entities and the known terms associated with one or more of the design-time artifacts. Once the terms are determined, an expression extraction and matching process is performed to identify how those determined terms are to be combined and used to create a valid structured expression 230. If for some reason either the term or expression matching process cannot identify a matching term/expression, feedback can be provided to the user of the potential issue. The user can correct the error and modify the input or cancel the process. Once the structured expression 230 is confirmed, the expression 230 can be submitted to the query generation process 235, where the standard rules engine operations are performed to output a SQL query 240.

Figure 3:
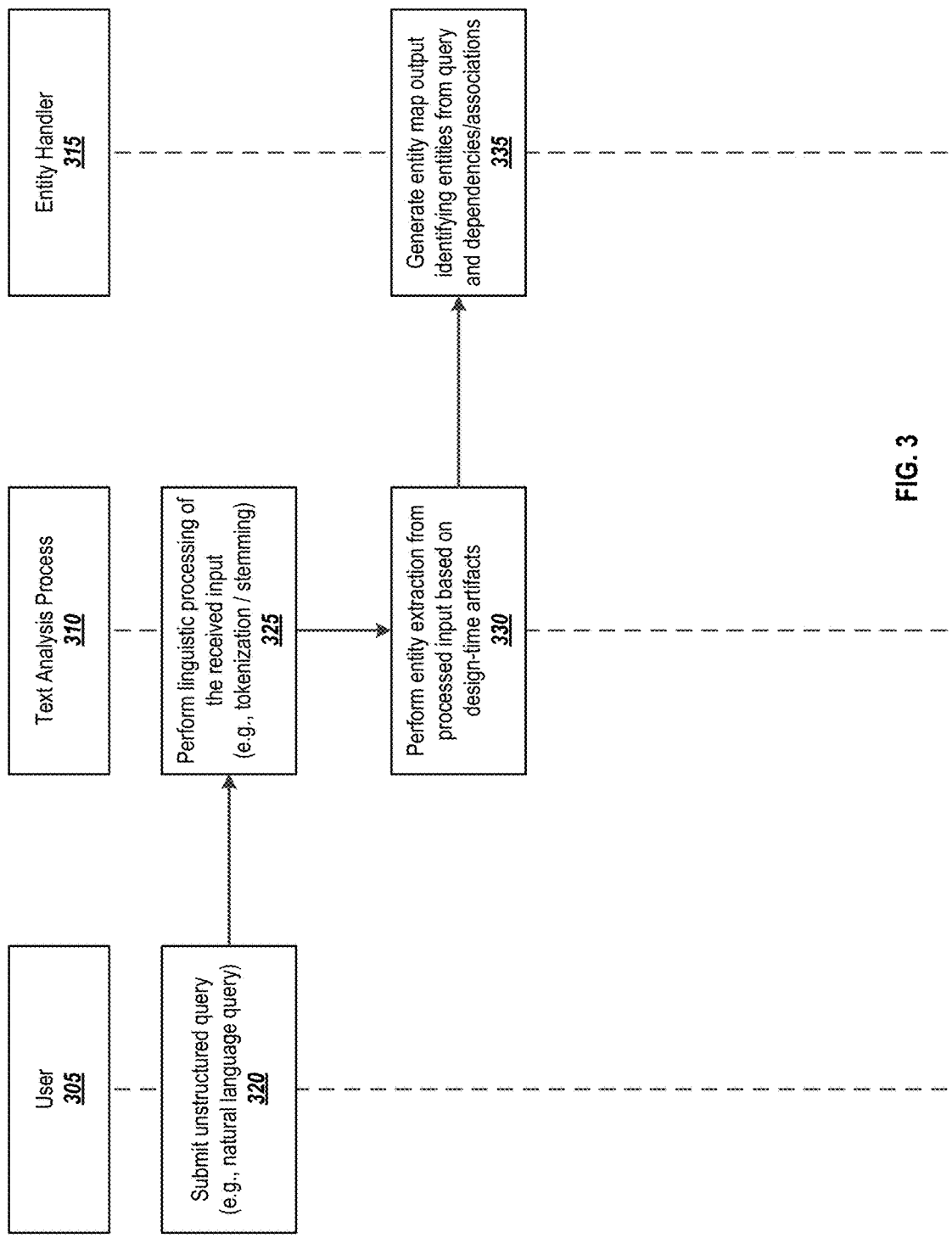
FIG. 3 illustrates an example swim lane diagram illustrating interactions between a user (or client device), a text analysis process, and an entity handler.

FIG. 3 illustrates an example swim lane diagram illustrating interactions 300 between a user 305 (or client device), a text analysis process 310, and an entity handler 315. As illustrated, the operations describe a sharing of responsibilities for identifying a particular unstructured query and beginning the process of interpreting the contents of that query into one or more entities. The text analysis process 310 and the entity handler 315 may be a single component or multiple components of the rules engine system and particularly, the text analysis portion of the rules engine. In the illustrated example, the design-time artifacts described previously have already been obtained by the rules engine system, and are ready to be used in understanding the submitted query.

At 320, the user submits an unstructured query, which may be in a natural language format. The unstructured query is received by the rules engine system and is analyzed by the text analysis process 310. At 325, a linguistic processing of the received input is performed. In some instances, the linguistic processing can include a tokenization of the received input to generate a set of tokens. Further, the processing can include a stemming operation to reducing the words associated with the tokens into a base or root form, which can allow the text analysis process 310 to perform further analysis.

At 330, the text analysis process 310 performs an entity extraction process from the linguistically-processed input based on the design-time artifacts. In particular, the analysis at 330 can identify which tokens represent specific types of objects or attributes associated with the corresponding application or with the rules engine grammar or vocabulary based on the design-time artifacts for each. At 335, the entity handler 315 can generate an entity map output identifying entities from the unstructured query and any dependencies and/or associations therein.

FIGS. 6-10 illustrate various types of design-time artifacts and corresponding runtime artifacts associated with the rules engine. For example, FIG. 9 illustrates an example entity map 905 for the unstructured input of "customer's age is way greater than 30" as generated by the interactions of FIG. 3. Here, 6 tokens are identified from the phrase based on a comparison to the existing design-time attributes (e.g., those of FIGS. 6, 7, and 8). Parent-child relationships are determined for 4 of the 6 tokens based on the textual analysis.

In FIGS. 6 and 7, design-time artifacts based on the rules engine's syntax and dictionary are shown. For example, FIG. 6 illustrates an example tokens container 605, patterns container 610, and entity types 615 as derived from the defined rules and syntax of the rules engine. As shown, the tokens container 605 includes various aggregate- and comparison-related tokens used in various rules. Patterns container 610 provides example expression patterns that can be used to match expressions in a generated expression stack to particular rule engine-supported expression templates or formats. The particular type of expression as well as the key entities included therein can be used to identify which expressions should be used. The entity types 615 provide the set of entity types accepted and acknowledged by the rules engine—here, the types of an attribute, data object, relation, comparison, aggregate, term, and simple comparison expression are accepted. FIG. 7 illustrates a set of generic dictionaries 705 used by the rules engine to define synonyms for various terms with a particular token meaning the same thing as the original token, but that is acceptable to or understood by the rules engine and/or its parser. For example, various terms corresponding to "greater than", "less", and "sum" may be associated with a variety of phrases that can be changed during the analysis to allow for the intended query.

Figure 8:
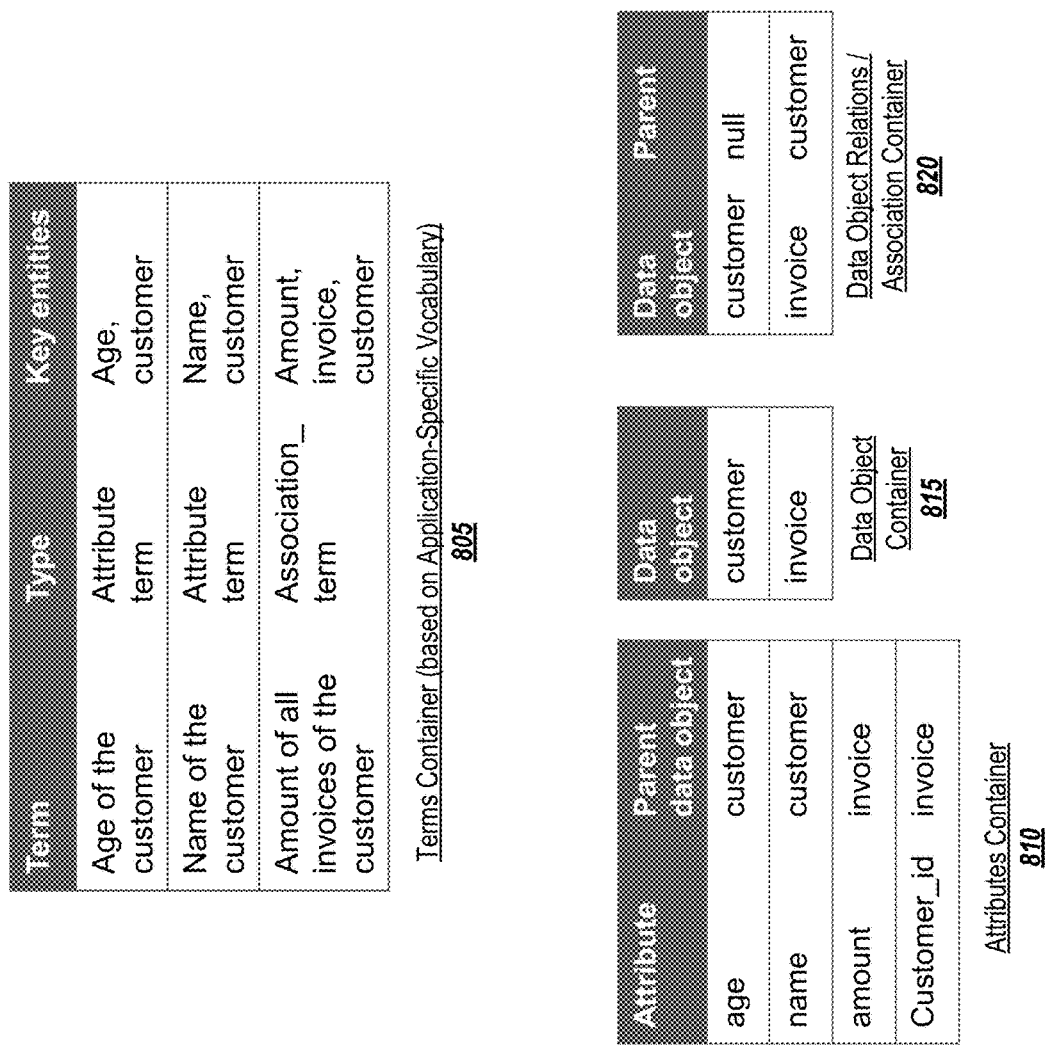
FIG. 8 illustrates an example set of application-specific design-time artifacts, including a terms container and a set of information included in an entity container: an attributes container, a data object container, and a data object relations/association container.

FIG. 8 illustrates a set of application-specific design-time artifacts, including a terms container 805 and a set of information included in an entity container: an attributes container 810, a data object container 815, and a data object relations/association container 820. Terms container 805 includes a set of application-specific terms as determined by the application-specific import processes. The terms included in the terms container 805 are used by an expression builder based on the entity map generated in 335, which matches any single entity from the entities derived by the text analysis process to an attribute, data object, and/or an association. Once a full path for a set of entities, the expression builder can try to match the entities and attributes to a full term based on the mapped key entities. The attributes container 810 includes a set of attributes and their corresponding parent data objects. The data object container 815 includes a set of data objects associated with the application, and the data object relations container 820 includes a relationship between particular data objects and their parent data object, if available.

Figure 4:
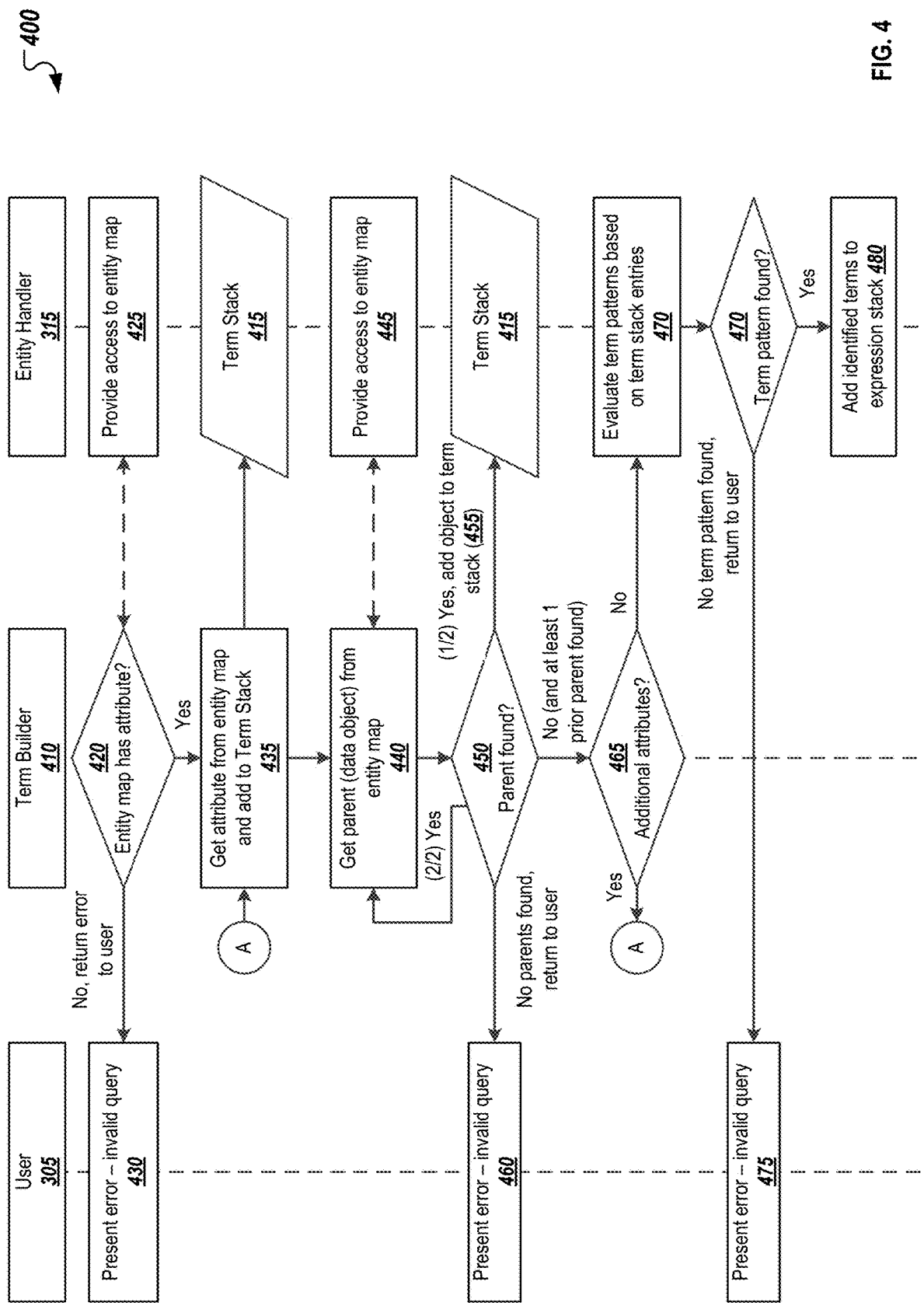
FIG. 4 illustrates an example swim lane diagram illustrating interactions between a user (or client device), a term builder, and the entity handler.

FIG. 10 illustrates an example expression stack 1005, the stack 1005 identifying three different terms as generated by a term builder (described in FIG. 4). The expression stack 1005 includes a term "age of the customer" of a type "term", "greater than" of type "comparison", and "30" of type "number." These terms can be used by the expression builder to compare to the patterns container to identify one or more patterns matching the types of the terms.

Turning to FIG. 4, FIG. 4 illustrates an example swim lane diagram illustrating interactions 400 between a user 305 (or client device), a term builder 410, and the entity handler 315. As illustrated, the operations describe a sharing of responsibilities for identifying particular terms from an entity map as generated through the interactions 300 of FIG. 3. Similar to FIG. 3, the term builder 410 and the entity handler 315 may be a single component or multiple components of the rules engine system and particularly, the expression builder portion of the rules engine. In the illustrated example, the design-time artifacts described previously have already been obtained by the rules engine system, and are ready to be used in understanding the submitted query.

At 420, a determination is made as to whether any attributes have been identified in the entity map (e.g., via access provided to the entity map at 425 by the entity handler 315). If no attributes are identified from the entity map, then an error is returned to the user 305 at 430, where an indication of an invalid query or unstructured text is returned. The user 305 may have the opportunity to revise the query at this point, allowing the overall process to begin again. If at least one attribute is identified at 420, then method 400 continues at 435, where the first attribute from the entity map is retrieved and added to the term stack 415. At 440, a parent (data object) of the particular attribute is obtained (e.g., via access to the entity map at 445). At 450, a determination is made as to whether a parent of the attribute is found in the entity map. If no parents for the attribute are found, then method 400 continues at 460, where an error is presented to the user 305. If, however, a parent is found, the parent object is added to the term stack 415 at 455, and method 400 returns to 440 to determine if a parent of the previously determined parent object is available. This process can iterate until a root parent object is identified. If, after at least one parent object has been found, no additional parents are found, method 400 continues at 465, where a determination is made as to whether additional attributes are included in the entity map. If so, method 400 returns to 435 where the next attribute is obtained from the entity map and added to the term stack 415. If, however, no additional attributes are available, method 400 continues at 470.

At 470, the entries in the term stack 415 are evaluated against the term patterns in the term container to determined. The terms container (as obtained as a design-time artifact from the application-specific vocabulary) can be used to determine if any combinations of key entities within the term stack match or correspond. At 470, a determination is made as to whether a term pattern is found. If no term patterns are found, an error can be presented to the user 305 at 475. If, however, a term pattern is found, the method 400 continues until all attributes have been reviewed and patterns associated with the generated terms are identified, and at 480 adds the various terms to the expression stack for further analysis by the expression builder process of FIG. 5.

Figure 5:
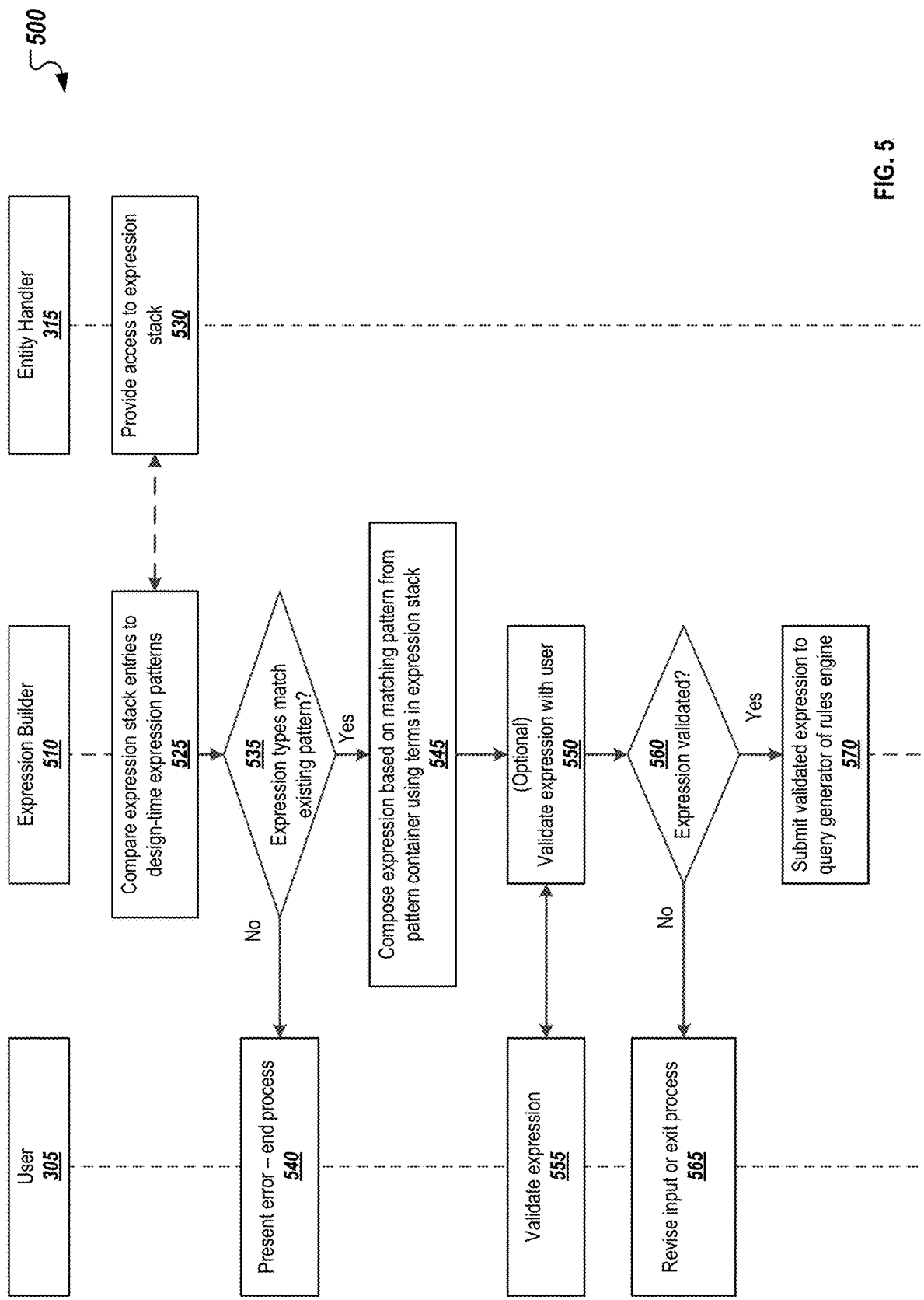
FIG. 5 illustrates an example swim lane diagram illustrating interactions between a user (or client device), an expression builder, and the entity handler.

FIG. 5 illustrates an example swim lane diagram illustrating interactions 500 between a user 305 (or client device), an expression builder 510, and the entity handler 315. As illustrated, the operations describe a sharing of responsibilities for identifying particular matched terms from a term stack 415 into an expression stack as generated through the interactions 400 of FIG. 4. Similar to FIG. 4, the expression builder 510 and the entity handler 315 may be a single component or multiple components of the rules engine system and particularly, the expression builder portion of the rules engine. In the illustrated example, the design-time artifacts described previously have already been obtained by the rules engine system, and are ready to be used in understanding the submitted query.

At 525, the contents of the expression stack entries (i.e., the determined terms and their types) are compared by the expression builder 510 to the design-time artifacts extracted and determined from the rules engine (e.g., the contents of the patterns container 610). The entity types of the terms from the expression stack (accessed via 530) are compared to the key entities included in particular patterns to identify which of the patterns are potential matches to the available terms. Multiple patterns may be identified from the terms, particularly if compound queries are associated with the unstructured input.

At 535, a determination is made as to whether the expression types included in the expression stack match at least one existing pattern from the pattern containers derived from the rules engine. If no matching patterns are identified, then method 500 continues at 540, where an error message is presented to the user 305. The process may end, or the user 305 may adjust or alter the unstructured input and the process can begin again. If, however, at least one pattern matches the expression types in the expression stack, method 500 continues at 545, where an expression based on the matching pattern from the pattern container is composed using at least some of the terms in the expression stack. If only a partial set of the terms in the expression stack are used, then the process can continue at 535 to determine if any additional patterns are matched. The operation of 545 includes composing the expression based on the semantic relations of the entities included in the entity map, such as entity map 905. Similar to building a term, the process is an iteration where the system checks, for every attribute of a term, whether there is an entity with which a semantic relation exists that points to the attribute of the term. If yes, the composition operation can continue, while if not, an error is triggered and returned to the user as a valid expression cannot be composed. In an example using entity map 905 of FIG. 9, a first attribute can be "greater than 30." An internal iteration on the components of the token are performed to identify what entities are dependent on it. As illustrated, the token "greater than" may have token 5, or "greater than 30," as its parent since it is the first entity in the semantic token. Starting at "greater than," a check is made as to whether the entity is a valid rules engine comparison token. If yes, then the token is added to the expression stack. The process continues to the next entity which is dependent on "greater than", which is the token "30" of type number. Since the token is a valid type in the rules engine, the number is added to the expression stack. As the last dependent portion of the chain from "greater than 30" is now analyzed, the process can continue with composing and building the expression based on the matching patterns of terms. Prior to building the expression, each of the entities having a semantic relation can be evaluated, including the phrase "customer's age" and the analysis of relationship between "age" and "customer".

Once the expression is built, at 550 an optional operation of validating the expression with the user may be performed. This can include presenting the generated structured expression to the user 305 (at 555) in order to confirm that the structured expression matches the intent of the unstructured input. Method 500 continues at 560, where a determination as to whether the structured expression was validated is made. If not validated, method 500 moved to 565, where the user 305 can elect to revise the input or exit the translation process. If changes to the unstructured input are made, the process can restart (e.g., at FIG. 3). If the expression is validated, method 500 can continue to 570, where the validated structured expression is submitted to the query generator of the rules engine for processing, resulting in an output of a well-defined SQL query.

Described implementations of the subject matter can include one or more features, alone or in combination.

For example, in a first implementation, a computer-implemented method, comprising: receiving an input identifying an unstructured query corresponding to a particular application associated with a rules framework associated with a pre-defined query structure format; analyzing the received input based on a first set of design time artifacts associated with the particular application and a second set of design time artifacts associated with the rules framework, the first set of design time artifacts uniquely associated with the particular application and the second set of design time artifacts generically associated with the rules framework, wherein the second set of design time artifacts are applied commonly to a plurality of different applications; and generating a structured query for the particular application in the pre-defined query structure format of the rules framework based on the first and second set of design time artifacts.

The foregoing and other described implementations can each optionally include one or more of the following features:

A first feature, combinable with any of the following features, wherein the first set of design time artifacts are generated prior to receiving the input, and comprise a set of data objects, attributes, data object relations, and terms specifically associated with the particular application.

A second feature, combinable with any of the previous or following features, wherein the second set of design time artifacts are generated prior to receiving the input, and comprise artifacts associated with a syntax and grammar associated with the pre-defined query structure format of the rules framework.

A third feature, combinable with any of the previous or following features, wherein the artifacts include tokens and patterns satisfying the pre-defined query structure format of the rules framework.

A fourth feature, combinable with any of the previous or following features, wherein analyzing the received input comprises performing linguistic and semantic processing on the received input to create an output of key tokens from the received input, the key tokens corresponding to a set of extracted entities and relationships between the extracted entities identified based on first and second set of design time artifacts; and identifying at least one term from a term container included in the first set of design time artifacts matching a combination of one or more of the key tokens, where the at least one identified terms are used for generating the structured query for the particular application.

A fifth feature, combinable with any of the previous or following features, wherein generating the structured query for the particular application comprises: identifying at least one expression created by a combination of the at least one identified terms where the at least one expression corresponds to a pattern defined within the second set of design time artifacts.

A sixth feature, combinable with any of the previous or following features, wherein the pattern is defined as a combination of entity types, and wherein each of the at least one identified terms are associated with an entity type.

A seventh feature, combinable with any of the previous or following features, wherein the received input identifying the unstructured query comprises a natural language query associated with the particular application.

In a second implementation, a non-transitory, computer-readable medium storing one or more instructions executable by a computer system to perform operations comprising: receiving an input identifying an unstructured query corresponding to a particular application associated with a rules framework associated with a pre-defined query structure format; analyzing the received input based on a first set of design time artifacts associated with the particular application and a second set of design time artifacts associated with the rules framework, the first set of design time artifacts uniquely associated with the particular application and the second set of design time artifacts generically associated with the rules framework, wherein the second set of design time artifacts are applied commonly to a plurality of different applications; and generating a structured query for the particular application in the pre-defined query structure format of the rules framework based on the first and second set of design time artifacts.

The foregoing and other described implementations can each optionally include one or more of the following features:

A first feature, combinable with any of the following features, wherein the first set of design time artifacts are generated prior to receiving the input, and comprise a set of data objects, attributes, data object relations, and terms specifically associated with the particular application.

A second feature, combinable with any of the previous or following features, wherein the second set of design time artifacts are generated prior to receiving the input, and comprise artifacts associated with a syntax and grammar associated with the pre-defined query structure format of the rules framework.

A third feature, combinable with any of the previous or following features, wherein the artifacts include tokens and patterns satisfying the pre-defined query structure format of the rules framework.

A fourth feature, combinable with any of the previous or following features, wherein analyzing the received input comprises: performing linguistic and semantic processing on the received input to create an output of key tokens from the received input, the key tokens corresponding to a set of extracted entities and relationships between the extracted entities identified based on first and second set of design time artifacts; and identifying at least one term from a term container included in the first set of design time artifacts matching a combination of one or more of the key tokens, where the at least one identified terms are used for generating the structured query for the particular application.

A fifth feature, combinable with any of the previous or following features, wherein generating the structured query for the particular application comprises identifying at least one expression created by a combination of the at least one identified terms where the at least one expression corresponds to a pattern defined within the second set of design time artifacts.

A sixth feature, combinable with any of the previous or following features, wherein the pattern is defined as a combination of entity types, and wherein each of the at least one identified terms are associated with an entity type.

A seventh feature, combinable with any of the previous or following features, wherein the received input identifying the unstructured query comprises a natural language query associated with the particular application.

In a third implementation, a computer-implemented system, comprising: a hardware processor interoperably coupled with a computer memory and configured to perform operations comprising: receiving an input identifying an unstructured query corresponding to a particular application associated with a rules framework associated with a pre-defined query structure format, the received input comprising a natural language query associated with the particular application; analyzing the received input based on a first set of design time artifacts associated with the particular application and a second set of design time artifacts associated with the rules framework, the first set of design time artifacts uniquely associated with the particular application and the second set of design time artifacts generically associated with the rules framework, wherein the second set of design time artifacts are applied commonly to a plurality of different applications; and generating a structured query for the particular application in the pre-defined query structure format of the rules framework based on the first and second set of design time artifacts.

The foregoing and other described implementations can each optionally include one or more of the following features:

A first feature, combinable with any of the following features, wherein the first set of design time artifacts are generated prior to receiving the input, and comprise a set of data objects, attributes, data object relations, and terms specifically associated with the particular application.

A second feature, combinable with any of the previous or following features, wherein the second set of design time artifacts are generated prior to receiving the input, and comprise artifacts associated with a syntax and grammar associated with the pre-defined query structure format of the rules framework, further wherein the artifacts include tokens and patterns satisfying the pre-defined query structure format of the rules framework.

A third feature, combinable with any of the previous or following features, wherein analyzing the received input comprises: performing linguistic and semantic processing on the received input to create an output of key tokens from the received input, the key tokens corresponding to a set of extracted entities and relationships between the extracted entities identified based on first and second set of design time artifacts; and identifying at least one term from a term container included in the first set of design time artifacts matching a combination of one or more of the key tokens, where the at least one identified terms are used for generating the structured query for the particular application; and wherein generating the structured query for the particular application comprises identifying at least one expression created by a combination of the at least one identified terms where the at least one expression corresponds to a pattern defined within the second set of design time artifacts, wherein the pattern is defined as a combination of entity types, and wherein each of the at least one identified terms are associated with an entity type.

Additional features similar to those described above may also be combinable with any of the previous features in the computer-implemented system.

Implementations of the subject matter and the functional operations described in this specification can be implemented in digital electronic circuitry, in tangibly and/or non-transitory embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by at least one processor, the method comprising:
receiving an input identifying an unstructured query corresponding to a particular application associated with a rules framework, the rules framework associated with a pre-defined query structure format, wherein the rules framework is associated with a plurality of different applications;
analyzing the received input based on a first set of design time artifacts that are uniquely associated with the particular application and a second set of design time artifacts associated with the rules framework, the second set of design time artifacts generically associated with the rules framework, wherein the second set of design time artifacts are applied commonly to each of the plurality of different applications;

generating a structured expression for the particular application in the pre-defined query structure format of the rules framework based on a combination of the first and second sets of design time artifacts;

presenting, at a user interface, a request for validation of the generated structured expression, wherein the request includes the generated structured expression and a request for validation that the generated structured expression matches an intent of the unstructured query included in the received input; and in response to receiving an indication of validation via the user interface, submitting the validated structured expression to a query generator for processing to obtain output comprising a structured query language (SQL) query generated for execution against a data set associated with the particular application.

2. The method of claim 1, wherein the first set of design time artifacts are generated prior to receiving the input, and comprise a set of data objects, attributes, data object relations, and terms specifically associated with the particular application.

3. The method of claim 1, wherein the second set of design time artifacts are generated prior to receiving the input, and comprise artifacts associated with a syntax and grammar associated with the pre-defined query structure format of the rules framework.

4. The method of claim 3, wherein the artifacts include tokens and patterns satisfying the pre-defined query structure format of the rules framework.

5. The method of claim 1, wherein analyzing the received input comprises:

performing linguistic and semantic processing on the received input to create an output of key tokens from the received input, the key tokens corresponding to a set of extracted entities and relationships between the extracted entities identified based on first and second set of design time artifacts; and identifying at least one term from a term container included in the first set of design time artifacts matching a combination of one or more of the key tokens, wherein each of the at least one identified terms is used for generating the structured expression for the particular application.

6. The method of claim 5, wherein generating the structured expression for the particular application comprises:

identifying at least one expression created by a combination of the at least one identified terms where the at least one expression corresponds to a pattern defined within the second set of design time artifacts, wherein the pattern is defined as a combination of entity types, and wherein each of the at least one identified terms are associated with an entity type.

7. The method of claim 1, wherein the received input identifying the unstructured query comprises a natural language query associated with the particular application.

8. A non-transitory, computer-readable medium storing one or more instructions executable by a computer system to perform operations comprising:

receiving an input identifying an unstructured query corresponding to a particular application associated with a rules framework, the rules framework associated with a pre-defined query structure format wherein the rules framework is associated with a plurality of different applications;

analyzing the received input based on a first set of design time artifacts that are uniquely associated with the particular application and a second set of design time artifacts associated with the rules framework, the second set of design time artifacts generically associated with the rules framework, wherein the second set of design time artifacts are applied commonly to a plurality of different applications;

generating a structured expression for the particular application in the pre-defined query structure format of the rules framework based on a combination of the first and second sets of design time artifacts;

presenting, at a user interface, a request for validation of the generated structured expression, wherein the request includes the generated structured expression and a request for validation that the generated structured expression matches an intent of the unstructured query included in the received input; and in response to receiving an indication of validation via the user interface, submitting the validated structured expression to a query generator for processing to obtain output comprising a structured query language (SQL) query generated for execution against a data set associated with the particular application.

9. The computer-readable medium of claim 8, wherein the first set of design time artifacts are generated prior to receiving the input, and comprise a set of data objects, attributes, data object relations, and terms specifically associated with the particular application.

10. The computer-readable medium of claim 8, wherein the second set of design time artifacts are generated prior to receiving the input, and comprise artifacts associated with a syntax and grammar associated with the pre-defined query structure format of the rules framework.

11. The computer-readable medium of claim 10, wherein the artifacts include tokens and patterns satisfying the pre-defined query structure format of the rules framework.

12. The computer-readable medium of claim 8, wherein analyzing the received input comprises:

performing linguistic and semantic processing on the received input to create an output of key tokens from the received input, the key tokens corresponding to a set of extracted entities and relationships between the extracted entities identified based on first and second set of design time artifacts; and identifying at least one term from a term container included in the first set of design time artifacts matching a combination of one or more of the key tokens, where the at least one identified terms are used for generating the structured expression for the particular application.

13. The computer-readable medium of claim 12, wherein generating the structured expression for the particular application comprises:

identifying at least one expression created by a combination of the at least one identified terms where the at least one expression corresponds to a pattern defined within the second set of design time artifacts.

14. The computer-readable medium of claim 13, wherein the pattern is defined as a combination of entity types, and wherein each of the at least one identified terms are associated with an entity type.

15. The computer-readable medium of claim 8, wherein the received input identifying the unstructured query comprises a natural language query associated with the particular application.

16. A computer system, comprising:
a computer memory; and
a hardware processor interoperably coupled with the computer memory and configured to perform operations comprising:
receiving an input identifying an unstructured query corresponding to a particular application associated with a rules framework, the rules framework associated with a pre-defined query structure format, the received input comprising a natural language query associated with the particular application, wherein the rules framework is associated with a plurality of different applications;
analyzing the received input based on a first set of design time artifacts that are uniquely associated with the particular application and a second set of design time artifacts associated with the rules framework, the second set of design time artifacts generically associated with the rules framework, wherein the second set of design time artifacts are applied commonly to a plurality of different applications;
generating a structured expression for the particular application in the pre-defined query structure format of the rules framework based on a combination of the first and second sets of design time artifacts;
presenting, at a user interface, a request for validation of the generated structured expression, wherein the request includes the generated structured expression and a request for validation that the generated structured expression matches an intent of the unstructured query included in the received input; and
in response to receiving an indication of validation via the user interface, submitting the validated structured expression to a query generator for processing to obtain output comprising a structured query language (SQL) query generated for execution against a data set associated with the particular application.

17. The system of claim 16, wherein the first set of design time artifacts are generated prior to receiving the input, and comprise a set of data objects, attributes, data object relations, and terms specifically associated with the particular application.

18. The system of claim 16, wherein the second set of design time artifacts are generated prior to receiving the input, and comprise artifacts associated with a syntax and grammar associated with the pre-defined query structure format of the rules framework, further wherein the artifacts include tokens and patterns satisfying the pre-defined query structure format of the rules framework.

19. The system of claim 16, wherein analyzing the received input comprises:
performing linguistic and semantic processing on the received input to create an output of key tokens from the received input, the key tokens corresponding to a set of extracted entities and relationships between the extracted entities identified based on first and second set of design time artifacts; and
identifying at least one term from a term container included in the first set of design time artifacts matching a combination of one or more of the key tokens, where the at least one identified terms are used for generating the structured expression for the particular application; and
wherein generating the structured query for the particular application comprises identifying at least one expression created by a combination of the at least one identified terms where the at least one expression corresponds to a pattern defined within the second set of design time artifacts, wherein the pattern is defined as a combination of entity types, and wherein each of the at least one identified terms are associated with an entity type.

20. The method of claim 1, the method further comprising, in response to receiving an indication rejecting validation via the user interface, receiving a revision to the structured expression via the user interface and attempting to validate the revised structured expression via the user interface.

* * * * *